United States Patent
Mathew et al.

(10) Patent No.: US 8,880,768 B2
(45) Date of Patent: Nov. 4, 2014

(54) STORAGE CONTROLLER SYSTEM WITH DATA SYNCHRONIZATION AND METHOD OF OPERATION THEREOF

(75) Inventors: Manoj Mathew, Sunnyvale, CA (US); Jin-Lon Hon, Milpitas, CA (US)

(73) Assignee: Promise Technology, Inc., Milpitas, CA (US)

( * ) Notice: Subject to any disclaimer, the term of this patent is extended or adjusted under 35 U.S.C. 154(b) by 239 days.

(21) Appl. No.: 13/112,988

(22) Filed: May 20, 2011

(65) Prior Publication Data

US 2012/0297107 A1    Nov. 22, 2012

(51) Int. Cl.
| | |
|---|---|
| *G06F 13/36* | (2006.01) |
| *G06F 13/28* | (2006.01) |
| *G06F 13/40* | (2006.01) |
| *G06F 3/06* | (2006.01) |
| *G06F 13/42* | (2006.01) |
| *G06F 13/20* | (2006.01) |

(52) U.S. Cl.
CPC ............ *G06F 13/20* (2013.01); *G06F 13/4045* (2013.01); *G06F 3/0689* (2013.01); *G06F 13/404* (2013.01); *G06F 13/4221* (2013.01)
USPC ................. 710/308; 710/20; 710/22; 710/31; 710/311; 710/313; 711/114

(58) Field of Classification Search
CPC ............ G06F 13/404; G06F 13/4045; G06F 13/4221; G06F 3/0689
USPC ............... 710/306, 20, 22, 31, 308, 311, 313; 711/114
See application file for complete search history.

(56) References Cited

U.S. PATENT DOCUMENTS

| | | | |
|---|---|---|---|
| 6,792,505 B2 * | 9/2004 | Otterness et al. ............. | 711/114 |
| 7,143,227 B2 * | 11/2006 | Maine ........................... | 710/306 |
| 7,315,911 B2 * | 1/2008 | Davies et al. ................. | 710/260 |
| 7,340,555 B2 * | 3/2008 | Ashmore et al. .............. | 710/313 |
| 7,536,495 B2 * | 5/2009 | Ashmore et al. .............. | 710/313 |
| 8,375,184 B2 * | 2/2013 | Kumar et al. ................. | 711/162 |
| 2003/0221061 A1 * | 11/2003 | El-Batal et al. ............... | 711/114 |
| 2006/0277347 A1 * | 12/2006 | Ashmore et al. .............. | 710/313 |
| 2010/0332756 A1 * | 12/2010 | Yarch et al. ................... | 711/119 |
| 2011/0167189 A1 * | 7/2011 | Matsubara et al. ........... | 710/308 |
| 2011/0238909 A1 * | 9/2011 | Kumar et al. ................. | 711/114 |
| 2012/0166699 A1 * | 6/2012 | Kumar et al. ................. | 710/306 |
| 2013/0110960 A1 * | 5/2013 | Luo et al. ...................... | 709/212 |

FOREIGN PATENT DOCUMENTS

WO    WO 2011010352 A1 *    1/2011    ................ G06F 3/06

* cited by examiner

*Primary Examiner* — Ryan Stiglic
(74) *Attorney, Agent, or Firm* — Ishimaru & Associates LLP

(57) ABSTRACT

A method of operation of a storage controller system includes: accessing a first controller having a synchronization bus; accessing a second controller, by the first controller, through the synchronization bus; and receiving a first transaction layer packet by the first controller including performing a multi-cast transmission between the first controller and the second controller through the synchronization bus.

20 Claims, 4 Drawing Sheets

STORAGE CONTROLLER SYSTEM WITH DATA SYNCHRONIZATION AND METHOD OF OPERATION THEREOF

CROSS-REFERENCE TO RELATED APPLICATION(S)

The present application contains subject matter related to concurrently filed U.S. patent application Ser. No. 13/112,983. The related application is assigned to Promise Technology, Inc. and the subject matter thereof is incorporated herein by reference thereto.

TECHNICAL FIELD

The present invention relates generally to a storage controller system, and more particularly to a system for providing fail-over protection and maintaining reliable process control in an Enterprise system.

BACKGROUND ART

In some computer systems, it is important to maximize the availability of critical data and applications. Generally, this is achieved by using a fault tolerant system or by using high availability ("HA") software, which is implemented on a cluster of multiple nodes.

A fault tolerant computer system includes duplicate hardware and software. For example, a fault tolerant server may have redundant power supplies, storage devices, fans, network interface cards, and so on. When one or more of these components fails, the fault is detected, and a redundant component takes over to continue servicing data and application requests. However, these systems typically are tightly coupled to the operating system and may rely on some operating system intervention to support full recovery.

HA software also provides fault detection and correction procedures. In contrast to fault tolerant systems, HA software is implemented on two or more nodes, which are arranged in a "cluster" and communicate over a link (e.g., a network). Typically, one node operates as the "master" for a particular application, where the master is responsible for executing the application. One or more other nodes within the cluster are "slaves" for that application, where each slave is available to take over the application from a failed master, if necessary.

Generally, one disadvantage to an HA system is that failure recovery typically takes much longer than it would with a fault tolerant system. Therefore, significant system downtimes may be perceived by system users. One reason for the relatively slow failure recovery times is the way that failures are detected and responded to.

In some systems, each slave periodically "pings" other nodes to determine whether they are reachable. If a slave determines that a master node is unreachable before expiration of a certain timeout period, the slave declares a failure and attempts to take over as master. Because this process relies on timeout periods and network communications, it provides slower recovery than is possible using fault tolerant systems. Besides being somewhat slower to recover, another disadvantage to these systems is that it is not possible to detect a failure of a single application within a master node. Instead, the entire node must fail in order for a failure to be detected.

The "Time Synchronization Protocol" (TSP) is an example of such an HA protocol, which is used by the clock synchronization programs timed and TEMPO. TSP supports messages for the election that occurs among slaves when, for any reason, the master disappears. Basically, the election process chooses a new master from among the available slaves when the original master ceases to send out heartbeat messages. All of these processes consume precious time and may extend the system recovery time.

However synchronizing critical controller data can be time consuming as well and slows the overall performance due to the added overhead imposed on the controller. The industry is searching for a solution that can minimize the time it takes to synchronize the critical controller data without adding undue cost.

Thus, a need still remains for storage controller system with data synchronization. In view of the Enterprise system requirements for uninterrupted reliable operation and increasing performance, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a storage controller system including: accessing a first controller having a synchronization bus; accessing a second controller, by the first controller, through the synchronization bus; and receiving a first transaction layer packet by the first controller includes performing a multi-cast transmission between the first controller and the second controller through the synchronization bus.

The present invention provides a storage controller system including: a first controller with a synchronization bus; a second controller accessed, by the first controller, through the synchronization bus; and a first host A module, coupled to the first controller, for sending a first transaction layer packet includes a multi-cast transmission between the first controller and the second controller through the synchronization bus.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
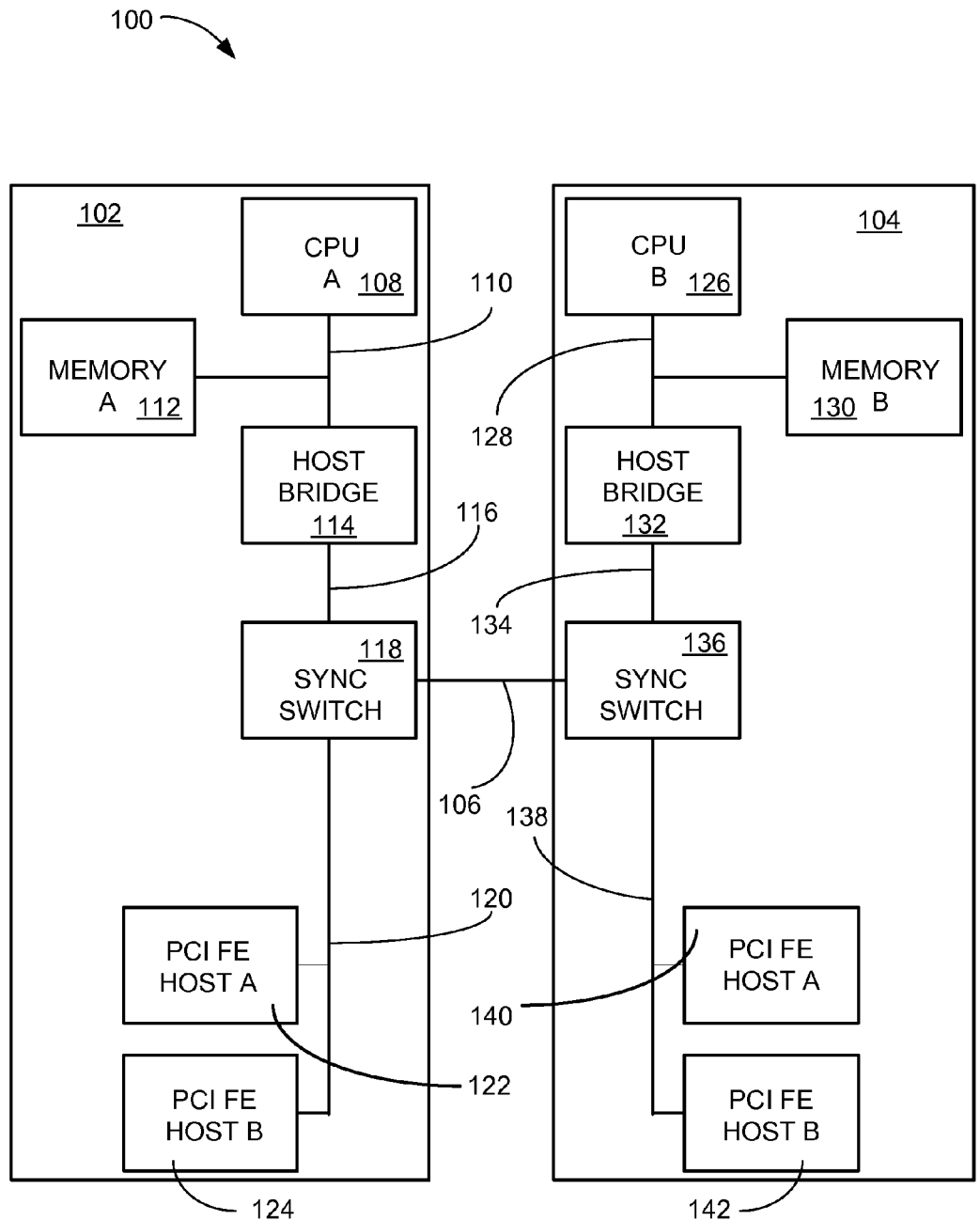
FIG. 1 is a functional block diagram of a storage controller system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The same numbers are used in all the drawing FIGs. to relate to the same elements. This numbering enhances the clarity of the description of the present invention.

The term "packet" refers to an organization of data, intent, identification, error correction codes, and address combined in transfer grouping that provides the basis of the communication protocol of the present invention. The term "processing" as used herein includes the manipulation of information from within a packet in order to deliver the content of the packet to the desired destination. The term "payload" refers to the deliverable data content held at the core of a packet. The term "user data" is defined to be command or check point information that is pertinent to the command execution of a controller that might be synchronized.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a micro-electro-mechanical system (MEMS), passive devices, or a combination thereof.

Referring now to FIG. 1, therein is shown a functional block diagram of a storage controller system 100, in an embodiment of the present invention. The functional block diagram of the storage controller system 100 depicts a first controller 102 coupled to a second controller 104 by a synchronization bus 106, such as a Peripheral Component Interconnect—Express (PCIe™) or other high-speed packet based transfer bus.

The first controller 102, can be implemented as a controller for a redundant array of independent disks (RAID), having a first central processing unit 108, such as a uni-processor or multi-processor module. The first central processing unit 108 can be coupled through a first host bus 110 to a first system memory 112 and a first host bridge 114. The first system memory 112 can provide a repository for the programs and applications that are executed by the first central processing unit 108. The first host bridge 114 provides an isolation mechanism for the first host bus 110 and acts as a bus translation structure for an internal peripheral device bus 116, such as a Peripheral Component Interconnect—Express (PCIe™) or other high-speed packet based transfer bus.

A first synchronization switch 118 of the first controller 102 can provide a portal to allow communication outside the first controller 102. A first communication bus 120, such as a Peripheral Component Interconnect—Express (PCIe™) or other high-speed packet based transfer bus, and the synchronization bus 106 can be coupled to the synchronization switch 118. The synchronization switch 118 allows direct transfer of messages between the first controller 102 and other devices, such as the second controller 104.

A first host A module 122, can be a Peripheral Component Interconnect—Express front end module that provides a communication path for a first system host, not shown, to the first controller 102. A first host B module 124, such as a Peripheral Component Interconnect—Express front end module can provide a communication path for a second system host, not shown, to the first controller 102. The first host A module 122 and the first host B module 124 are interface circuits that allow access to the first controller 102. The first host A module 122 and the first host B module 124 can be in the form of integrated circuits that provide an external connection through interfaces, such as Fiber Channel (FC), serial attached small computer system interface (SAS), or Internet small computer system interface (iSCSI), to a first system host A (not shown) and a second system host B (not shown). It is understood that the first system host A and the second system host B can be the same machine, having multiple interface circuits, or different machines.

The second controller 104 can be similar to the first controller 102 and can have a second central processing unit 126, such as a uni-processor or multi-processor module. The second central processing unit 126 can be coupled through a second host bus 128 to a second system memory 130 and a second host bridge 132. The second system memory 130 can provide a repository for the programs and applications that are executed by the second central processing unit 126. The second host bridge 132 provides an isolation mechanism for the second host bus 128 and acts as the bus translation structure for a second internal peripheral device bus 134, such as a Peripheral Component Interconnect—Express or other high-speed packet based transfer bus.

A second synchronization switch 136 provides a portal to allow communication outside the second controller 104. A second communication bus 138, such as a Peripheral Component Interconnect—Express or other high-speed packet based transfer bus, and the synchronization bus 106 can be coupled to the second synchronization switch 136. The second synchronization switch 136 allows direct transfer of messages between the second controller 104 and other devices, such as the first controller 102.

A second host A module 140, such as a Peripheral Component Interconnect—Express front end module, can provide a communication path for the first system host, not shown, to the second controller 104. A second host B module 142, such as a Peripheral Component Interconnect—Express front end module, can provide a communication path for the second system host, not shown, to the second controller 104. The second host A module 140 and the second host B module 142 are interface circuits that allow access to the second controller 104. The interface circuits may be in the form of integrated circuits on a motherboard or plug-in cards coupled to a larger system that may represent a first system host A (not shown) and a second system host B (not shown).

Figure 2:
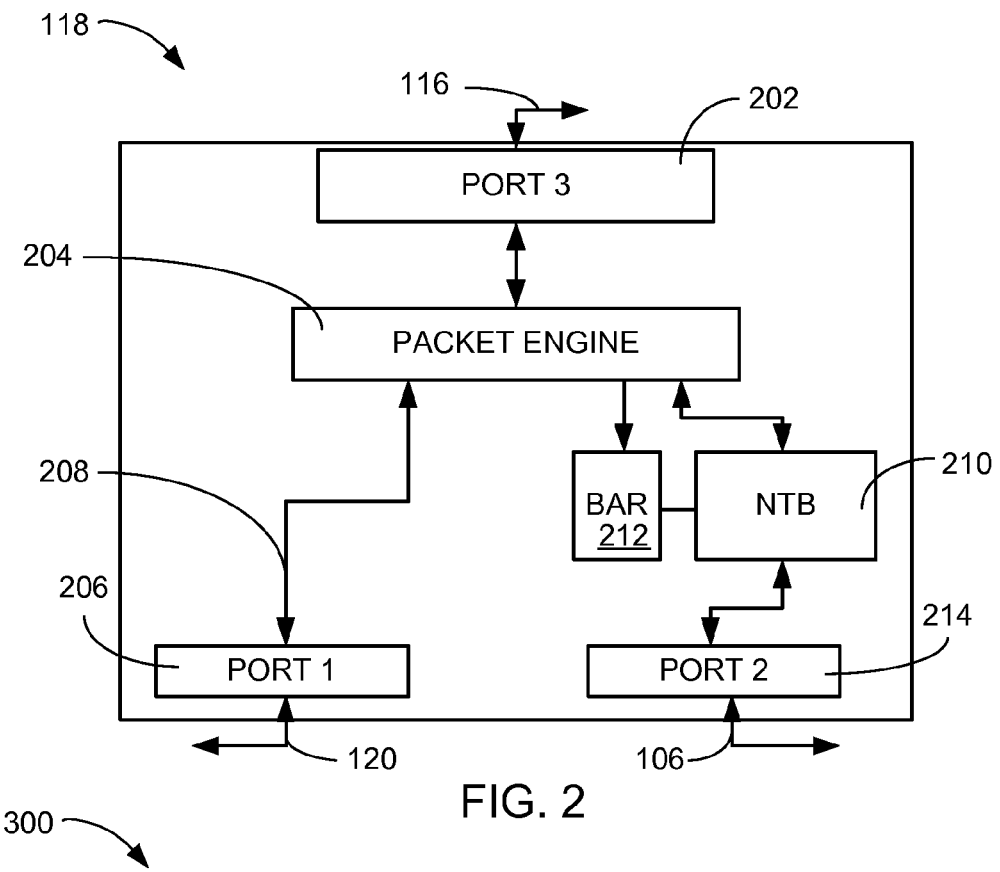
FIG. 2 is a functional block diagram of the synchronization switch of FIG. 1.

Referring now to FIG. 2, therein is shown a functional block diagram of the synchronization switch 118 of FIG. 1. The functional block diagram of the synchronization switch 118 depicts a third port 202 that can provide the electrical signals and timing for the internal peripheral device bus 116. The third port 202 can be coupled to a packet engine 204 of the synchronization switch 118, such as a sequential processor that can route and check the correctness of packets.

A first port 206 can be coupled to the packet engine 204 through a host interface bus 208. The first port 206 can be an electronic interface for transmitting and receiving packets between the synchronization switch 118 and the first system host A through the first host A module 122 and the first host B module 124 or the second system host B through the second host A module 140 and the second host B module 142. The first port 206 can be coupled to the first communication bus 120 for communication with an external host (not shown). During normal operation a packet transmitted by the external host is received through the first port and gated through the host interface bus 208 to the packet engine 204 for analysis and forwarding.

The packet engine 204 can also be coupled to a non-transparent bridge 210. The non-transparent bridge 210 is different from a transparent bridge in that the inside and the outside of the bridge are isolated from each other during initialization. A transparent bridge (not shown) will allow access to all of the devices (memory, ports, or interface devices) during initialization so the processor coupled to it can map them into its memory structure for system access. In contrast the non-transparent bridge 210 can be used to couple two processors together without each having access to the other. This is useful as a communication access between the two processors. Each of the processors sees the non-transparent bus 210 as an end device and maps it into its own memory map accordingly.

A base address register 212 may also be coupled between the packet engine 204 and the non-transparent bridge 210. The base address register 212 can provide a translation address for the non-transparent bridge 210. The translation address provided by the base address register 212 can allow the non-transparent bridge 210 to redirect a packet to a destination other than the one intended by the sender of the packet.

The non-transparent bridge 210 can be coupled to a second port 214, which manages the communication on the synchronization bus 106. The combination of the base address register 212 with the non-transparent bridge 210 and the packet engine 204 provides a unique method of providing controller synchronization between the first controller 102, of FIG. 1, and the second controller 104, of FIG. 1.

The packet engine 204 can determine the type of packet that is entering the first port 206 and in some instances will provide a multi-cast transmission of the packet to both the third port 202 and the non-transparent bridge 210 in a concurrent transfer. The multi-cast transmission provides the received packet to the internal peripheral device bus 116 and a copy of the packet with a dynamic address translation through the non-transparent bridge 210 to the synchronization bus 106.

It has been unexpectedly discovered that multi-cast transmission provided by the packet engine 204 and the non-transparent bridge 210 provides a high speed and low latency method of synchronizing command or check-point information between the first controller 102 and the second controller 104, without any intervention from first central processing unit 108 or the second central processing unit 126. While the example of the first controller 102 coupled to the second controller 104 is discussed as a multi-cast, it is understood that any number of the second controller 104 could be coupled to the first controller 102 through multiple instances of the synchronization bus 106.

Figure 3:
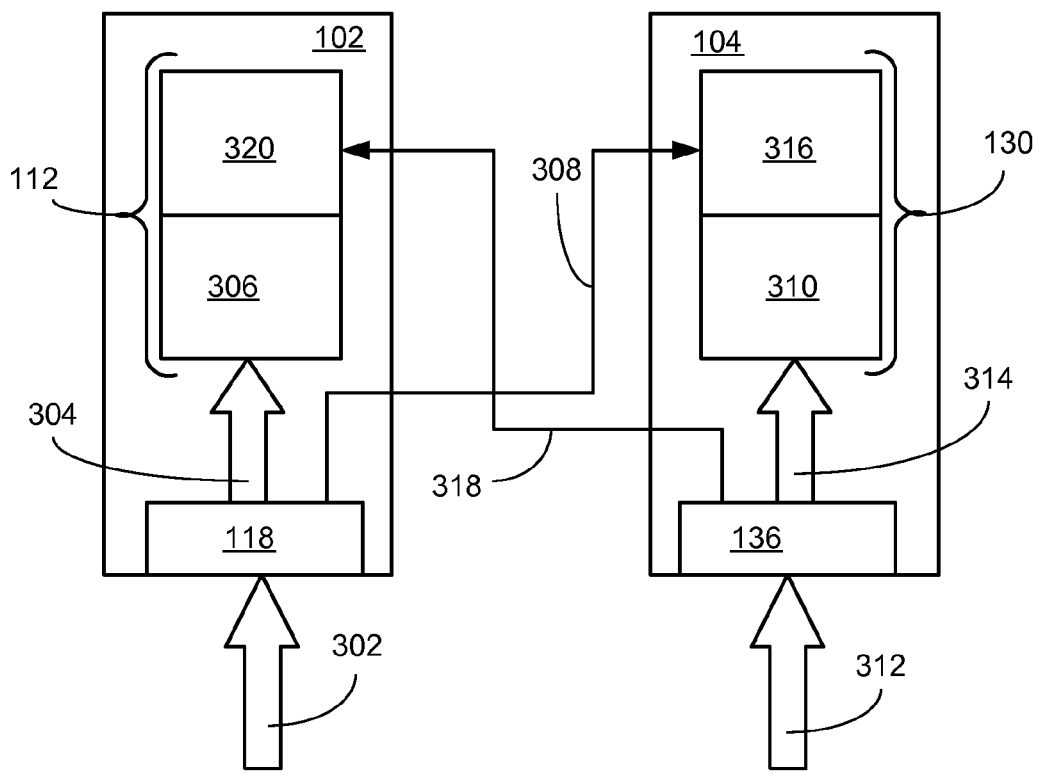
FIG. 3 is an operational block diagram of the operation of the storage controller system of FIG. 1.

Referring now to FIG. 3, therein is shown an operational block diagram of the operation of the storage controller system 100 of FIG. 1. The operational block diagram of the operation of the storage controller system 100 depicts a first transaction layer packet 302 entering the synchronization switch 118. The first transaction layer packet 302 can be one of four types of transaction. The first transaction layer packet 302 may be a memory read/write, an I/O read/write, a configuration read/write, or a message.

The synchronization switch 118, upon receipt of the first transaction layer packet 302 that is a memory write to a specific address range will initiate a multi-cast transmission by forwarding an internal packet 304 to a first local memory segment 306, within the first system memory 112, and concurrently sending a first address translated packet 308 to a first remote memory segment 316, within the second system memory 130. It is understood that the first remote memory segment 316 can be mapped to any location within the second system memory 130.

Similarly a second transaction layer packet 312 can be checked by the second synchronization switch 136. If the correct type of the second transaction layer packet 312 is detected, having a memory write command and to the specific address range, a multi-cast transmission will be initiated to forward a second internal packet 314 to a second local memory segment 310, within the second system memory 130, and concurrently sending a second address translated packet 318 to a second remote memory segment 320, within the first system memory 112. The second address translated packet 318 stored in the second remote memory segment 320 does not cause an interrupt of the first central processing unit 108, of FIG. 1. Since the first controller 102 and the second controller 104 are substantially similar, the second central processing unit 126 is not interrupted by storing a first address translated packet 308 in the first remote memory segment 316, within the second system memory 130.

By performing a concurrent transfer of all of the user data within the first transaction layer packet 302 and the second transaction layer packet 312, a copy of all of the user data will always be available in the event one of the controllers should fail. If the first controller 102 should fail to operate correctly, the second controller 104 contains all of the user data from the first controller 102 within the second system memory 130. By accessing the first remote memory segment 316 within the second system memory 130, the second controller 104 can complete all of the transactions that would have been supported by the first controller 102.

It has been discovered that the storage controller system 100 and device or product of the present invention furnishes important and heretofore unknown and unavailable solutions, capabilities, and functional aspects for maintaining system level synchronization of data and applications in an Enterprise System environment, having controller pairs. The synchronization switch 118 providing multiple concurrent destinations for the first transaction layer packet 302, with no additional overhead, can replace a lengthy synchronization process by first central processing unit 108 or the second central processing unit 126. This helps to achieve low latency and high bandwidth synchronization and free the first central processing unit 108 or the second central processing unit 126 and the first system memory 112 or the second system memory 130 resource to be used for other tasks. In an example, the second controller 104 could detect that the first controller 102 had failed and commence to support all of the operations that were pending on the first controller 102, without intervention from the host operating system. This dynamic switching provides significantly less latency in the recovery process because all of the first transaction layer packets 302, sent to the first controller 102, are also stored in the memory of the second controller 104.

In the example of the first controller 102 and the second controller 104 both being RAID controllers, the constant synchronization of the user data, would allow an immediate switching of controllers in the event that the first controller 102 or the second controller 104 failed. By providing a hardware enabled switch of the transfer processes between the first controller 102 and the second controller 104, all of the pending transactions in the RAID system could continue to be supported without intervention of the external host system.

Figure 4:
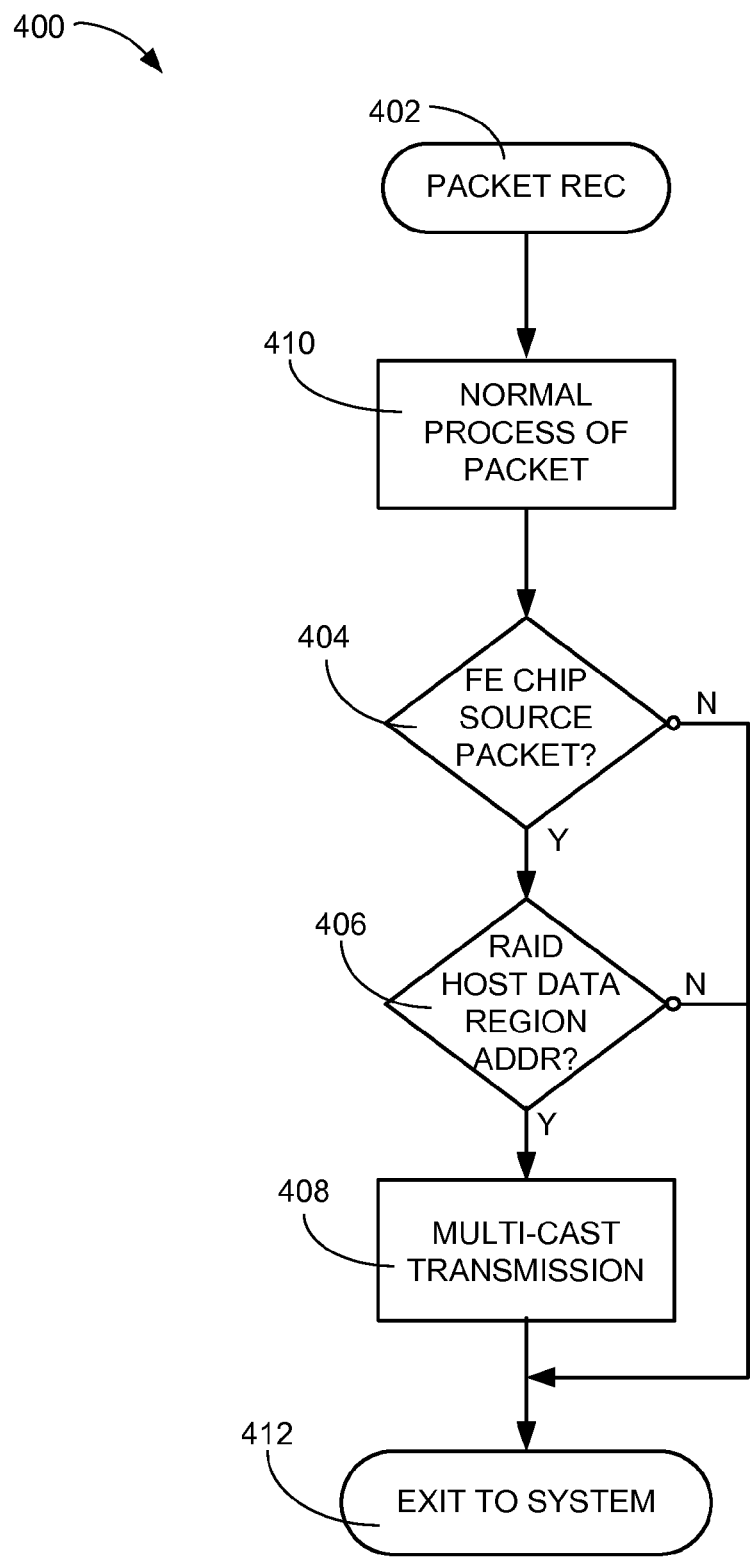
FIG. 4 is a packet received flow of the packet engine of the synchronization switch of FIG. 2.

Referring now to FIG. 4, therein is shown is a packet received flow 400 of the packet engine 204 of the synchronization switch 118, of FIG. 2. The operational flow diagram of the packet engine 204 depicts a packet received entry 402 that can indicate that the packet engine has detected the arrival of a packet by receiving a packet interrupt. The flow proceeds to a normal processing of packet 410 in order to process a non-user data related operation by the first controller 102 of FIG. 1. The flow then continues to a check source block 404 to determine whether the received packet arrived through the first port 206, of FIG. 2, from the external host (not shown).

If the received packet did come from the first port 206, the flow proceeds to a transaction layer packet check 406, where the packet engine 204 determines whether the received packet is the correct type of the first transaction layer packet 302, of FIG. 3 and is targeted to a specific block address. It is understood that the check source block can be made to differentiate specific addresses that might activate a multi-cast transmission for synchronizing the first controller 102 and the second controller 104 of FIG. 1. If it is determined that the packet engine 204 has received the first transaction layer packet 302, is of the correct type and is targeted to the specific block address, the flow proceeds to a multi-cast transmission 408 and then moves directly to an exit to system 412.

The initialization of the multi-cast transmission takes place in the multi-cast transmission 408, but the actual transmission of the internal packet 304, of FIG. 3, and the first address translated packet 308, of FIG. 3, occurs concurrently. The multi-cast transmission 408 is enabled by the packet engine 204 and transfers the first transaction layer packet 302 to the first internal packet 304, of FIG. 3, and the first address translated packet 308, of FIG. 3, concurrently. While the path for the first transaction layer packet 302 always includes the first internal packet 304, in the multi-cast transmission 408 the first transaction layer packet 302 also generates the first address translated packet 308. The first address translated packet 308 is sent to the first remote memory segment 316, of FIG. 3, in the second controller 104 of FIG. 1.

If the check source block 404 determines that the received packet is not from the first port 206, the flow would proceed immediately to the exit to system 412. This would indicate that the received packet and the packet interrupt was coming through the non-transparent bridge 210, of FIG. 2 or the third port 202, of FIG. 2. The packet engine 204, of FIG. 2, can be configured to only forward packets from certain device addresses. In this case the received packet would be the first address translated packet 308 and would be sent to only the second remote memory segment 320, of FIG. 3, within the first controller 102.

If the transaction layer packet check 406 determines that the received packet is not one of the memory read/write or I/O read/write operations of the first transaction layer packet, the flow would proceed to the exit to system 412 an no further operation is performed by the first controller 102 of FIG. 1.

It is understood that the previously described flow is an example only and other tasks or decision blocks are possible. While the packet engine 204 is in the process of receiving the packet, the type of packet and its destination can be determined from an initial segment of the packet and appropriate packet transaction is enabled so that the hardware can complete the transfer with no further interaction from the packet received flow 400.

The packet received flow 400 can be executed by a hardware state machine (not shown) without inducing any additional operations that could delay in the packet transfer. The resulting operation provides a full synchronization of the user data transferred to either the first controller 102 or the second controller 104 with no further intervention. The constant synchronization of the user data on both the first controller 102 and the second controller 104 provides the high speed and low latency support for a failover between the two controllers.

Figure 5:
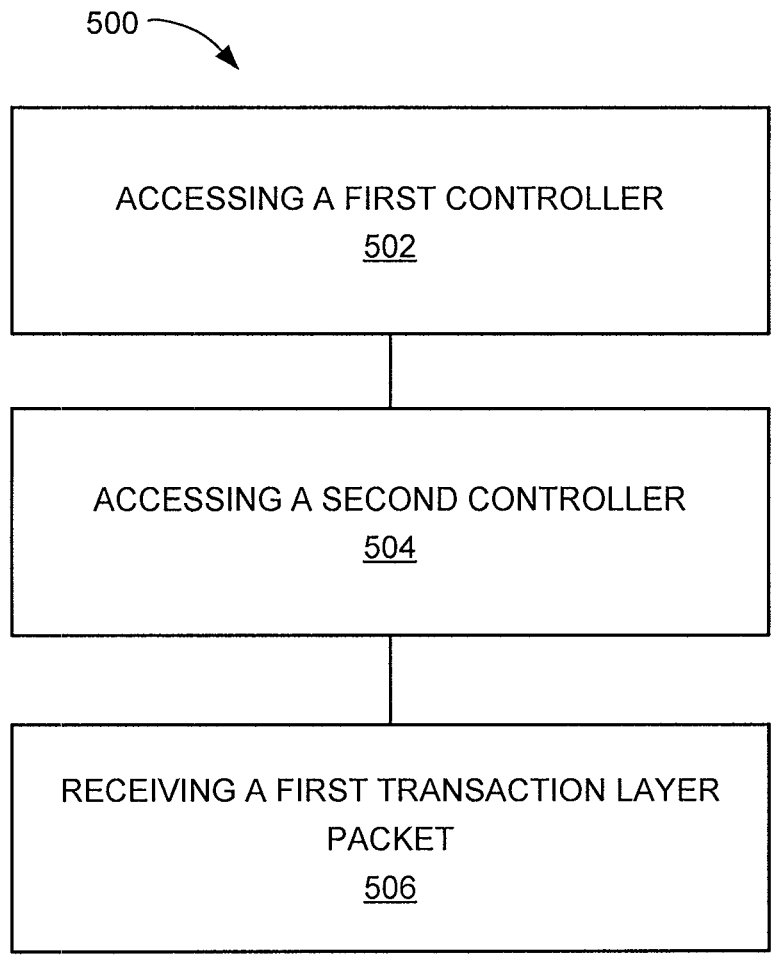
FIG. 5 is a flow chart of a method of operation of a storage controller system in a further embodiment of the present invention.

Referring now to FIG. 5, therein is shown a flow chart of a method 500 of operation of a storage controller system 100 in a further embodiment of the present invention. The method 500 includes: accessing a first controller having a synchronization bus in a block 502; accessing a second controller, by the first controller, through the synchronization bus in a block 504; and receiving a first transaction layer packet by the first controller including performing a multi-cast transmission between the first controller and the second controller through the synchronization bus in a block 506.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a storage controller system comprising:
    accessing a first controller having first non-transparent bridge and a synchronization bus;
    accessing a second controller, by the first controller, through the synchronization bus; and
    receiving a first transaction layer packet by the first controller including performing a multi-cast transmission between the first non-transparent bridge of the first controller and the second controller through the synchronization bus, wherein the multi-cast transmission is initiated by a synchronization switch of the first controller upon receipt of the first transaction layer packet and is provided by a packet engine of the synchronization switch without any intervention from a first central processing unit of the first controller and a second processing unit of the second controller.

2. The method as claimed in claim 1 further comprising enabling the synchronization switch having the first non-transparent bridge including generating a first address translated packet for the multi-cast transmission.

3. The method as claimed in claim 1 further comprising writing to a first system memory n the first controller including:
    copying an internal packet to a first local memory segment in the first system memory; and copying a second address translated packet, from the second controller, to a second remote memory segment in the first system memory.

4. The method as claimed in claim 1 wherein receiving the first transaction layer packet by the first controller includes:
checking a first port for the first transaction layer packet;
performing a transaction layer packet check for determining a correct type of the first transaction layer packet; and
enabling the packet engine and a non-transparent bridge concurrently for executing the multi-cast transmission.

5. The method as claimed in claim 1 wherein accessing the second controller through the synchronization bus includes:
enabling a packet engine in the second controller;
determining a non-transparent bridge was supplying the packet by the packet engine; and
transferring a second internal packet, through the non-transparent bridge, to a first remote memory segment in the second controller.

6. A method of operation of a storage controller system comprising:
accessing a first controller having first non-transparent bridge, a synchronization bus and a first communication bus;
accessing a second controller, by the first controller, through the synchronization bus; and
receiving a first transaction layer packet, through the first communication bus, by the first controller including performing a multi-cast transmission from the first non-transparent bridge of the first controller to the second controller through the synchronization bus, wherein the multi-cast transmission is imitated by a synchronization switch of the first controller upon receipt of the first transaction layer packet and is provided by a packet engine of the synchronization switch without any intervention from a first central processing unit of the first controller and a second processing unit of the second controller.

7. The method as claimed in claim 6 further comprising enabling a synchronization switch having the first non-transparent bridge including generating a first address translated packet including accessing a base address register by the non-transparent bridge for the first address translated packet of the multi-cast transmission.

8. The method as claimed in claim 6 further comprising writing a first system memory in the first controller including:
copying an internal packet to a first local memory segment in the first system memory and concurrently transferring a first address translated packet to a first remote memory segment in a second system memory; and
copying a second address translated packet to a second remote memory segment in the first system memory and concurrently transferring a second internal packet to a second local memory segment in the second system memory.

9. The method as claimed in claim 6 wherein receiving the first transaction layer packet by the first controller includes:
checking a first port for the first transaction layer packet;
performing a transaction layer packet check for determining a correct type of the first transaction layer packet; and
enabling the packet engine and the first non-transparent bridge concurrently for executing the multi-cast transmission including transferring an internal packet and a first address translated packet concurrently.

10. The method as claimed in claim 6 wherein accessing the second controller through the synchronization bus includes:
enabling a packet engine in the second controller;
determining the first non-transparent bridge was supplying the packet by the packet engine; and
transferring a second internal packet, through the non-transparent bridge, to a first remote memory segment in a second system memory of the second controller.

11. A storage controller system comprising:
a first controller with a synchronization bus;
a second controller accessed, by the first controller, through the synchronization bus; and
a first host A module, coupled to the non-transparent bridge of the first controller, for sending a first transaction layer packet includes a multi-cast transmission from the first non-transparent bridge of the first controller to the second controller through the synchronization bus, wherein the multi-cast transmission is initiated by a synchronization switch of the first controller upon receipt of the first transaction layer packet and is provided by a packet engine of the synchronization switch without any intervention from a first central processing unit of the first controller and a second processing unit of the second controller.

12. The system as claimed in claim 11 wherein the first controller includes the synchronization switch with a non-transparent bridge for generating a first address translated packet.

13. The system as claimed in claim 11 wherein the first controller includes a first system memory with an internal peripheral interface coupled to a first local memory segment of the first system memory.

14. The system as claimed in claim 11 wherein the first controller includes the packet engine enabled by:
a first port coupled to the packet engine for checking the first transaction layer packet;
the first non-transparent bridge coupled between the second controller and the packet engine; and
a third port coupled to the packet engine for executing the multi-cast transmission.

15. The system as claimed in claim 11 wherein the second controller accessed through the synchronization bus includes:
a packet engine, in the second controller, coupled to the synchronization bus;
the first non-transparent bridge between the synchronization bus and the packet engine; and
a host bridge coupled to a first remote memory segment in the second controller.

16. The system as claimed in claim 11 further comprising a first communication bus and the synchronization bus for coupling the first controller.

17. The system as claimed in claim 16 wherein the first controller includes a synchronization switch with a non-transparent bridge with a base address register accessed by the first non-transparent bridge for generating the first address translated packet.

18. The system as claimed in claim 16 wherein the first controller includes a first system memory with a first host bridge coupled to a first local memory segment of the first system memory and a non-transparent bridge concurrently enabled for transferring a first address translated packet to a first remote memory segment in a second system memory.

19. The system as claimed in claim 16 wherein the first controller includes the packet engine enabled by:
a first port coupled to the packet engine for checking the first transaction layer packet;

a first non-transparent bridge coupled between the second controller and the packet engine; and an internal peripheral interface coupled to the packet engine for executing the multi-cast transmission includes an internal packet through a first host bridge and a first address translated packet transferred concurrently through the non-transparent bus.

20. The system as claimed in claim 16 wherein the second controller accessed through the synchronization bus includes:

a packet engine in the second controller coupled to the synchronization bus;

a second non-transparent bridge between the synchronization bus and the packet engine; and a host bridge coupled to a first remote memory segment in the second controller.

* * * * *